United States Patent [19]

Johnson et al.

[11] 4,352,893
[45] Oct. 5, 1982

[54] PRODUCTION OF FOAMED POLYMER

[75] Inventors: D. Emil Johnson, Canandaigua; G. Vincent Sharps, Jr., Fairport, both of N.Y.

[73] Assignee: Mobil Oil Corporation, New York, N.Y.

[21] Appl. No.: 153,301

[22] Filed: Jul. 14, 1980

Related U.S. Application Data

[63] Continuation-in-part of Ser. No. 61,980, Jul. 30, 1977, abandoned.

[51] Int. Cl.³ ............................................. B29D 27/00
[52] U.S. Cl. ..................................... 521/79; 264/45.5; 264/46.1; 264/210.2; 264/237; 425/71; 425/378 R; 425/817 C; 521/51; 521/98; 521/918
[58] Field of Search ............... 264/53, 51, 45.5, 210.2, 264/237, 45.9, 46.1, 46.1; 425/71, 378 R, 817 C; 521/131, 918, 79, 51, 98; 428/218

[56] References Cited

U.S. PATENT DOCUMENTS

| 3,121,132 | 2/1964 | Del Bene | 264/53 X |
| 3,121,760 | 2/1964 | Kline | 264/51 |
| 3,372,215 | 3/1968 | Muirhead et al. | 264/53 |
| 3,864,444 | 2/1975 | Johnson | 264/53 X |
| 4,009,976 | 3/1977 | Johnson | 425/71 X |
| 4,098,941 | 7/1978 | Johnson | 428/218 |

OTHER PUBLICATIONS

Bernhardt, Ernest C., Edt. "Processing of Thermoplastic Materials", New York, Reinhold, ©1959, pp. 214–216.

Primary Examiner—Philip E. Anderson
Attorney, Agent, or Firm—Charles A. Huggett; James F. Powers, Jr.; James P. O'Sullivan, Jr.

[57] ABSTRACT

Polymer foam is extruded as a tube or sheet into a cooling liquid which is maintained at a temperature up to about 85° C. Either one or both surfaces of the polymer are cooled as the extrudate emerging from the die orifice passes through the liquid. Styrenic polymer foam extrudate produced by such a method exhibits excellent puncture resistance and tensile properties.

16 Claims, 6 Drawing Figures

PRODUCTION OF FOAMED POLYMER

REFERENCE TO COPENDING APPLICATIONS

This application is a continuation-in-part of U.S. patent application Ser. No. 061,980, filed July 30, 1979, now abandoned.

FIELD OF THE INVENTION

The present invention relates to the extrusion of molten styrenic polymer foam into a coolant, such as water, which is maintained below its boiling point. More specifically this invention deals with the production of a foam structure which is characterized by having an integral surface skin whereby such foam may be fabricated into molded products which exhibit superior puncture resistance and tensile properties as compared to prior art foam structures.

DESCRIPTION OF THE PRIOR ART

It has been proposed to produce foam sheet material having further strength characteristics by stretching the extruded foam at an orientation temperature in both the longitudinal and transverse directions. See for example, U.S. Pat. Nos. 3,055,048 (Koppehele) and 3,676,539 (Fisher). U.S. Pat. Nos. 3,864,444, 4,009,976 and 4,098,941 disclose methods for the extrusion of molten polystyrene foam into a boiling water media to improve the physical characteristics of the foam.

U.S. Pat. No. 3,299,192 (Lux) states that the rigidity, liquid handling, and thermal insulation capability of foamed plastic pipe was enhanced by quench chilling the internal and exterior walls of the tube within a short time after it emerged from an extrusion die. The patent notes that such chilling produces an impervious and non-porous (so as to promote liquid handling) internal and external skin on the pipe. The patent notes that the inner skin might be made 2 to 5 times as thick as the outer skin for purposes of carrying liquids such as water. The disclosure suggested coolant temperatures of 0° F. to 80° F. and velocities of 50 to 100 ft/sec. The examples recite the use of 70° F. air as a coolant blasted from a nozzle upon the extrudate surfaces. Such chilling produced a pipe having a core representing 50 to 94% of the thickness of the pipe, the interior and exterior skins representing the balance of the pipe thickness.

SUMMARY OF THE INVENTION

A method is provided whereby careful control of the cooling bath media within a specified range and careful control of the extruder die temperature results in the production of superior styrenic polymer foam sheets exhibiting excellent resistance to punctures and improved tensile properties. By maintaining a cooling water bath at a temperature from about 40° C. up to about 85° C., and by controlling melt temperature to within a range of 125° C. up to about 165° C., foam sheets may be produced having physical characteristics far superior to those of prior art foam sheet material.

DESCRIPTION OF SPECIFIC EMBODIMENTS

Figure 1:
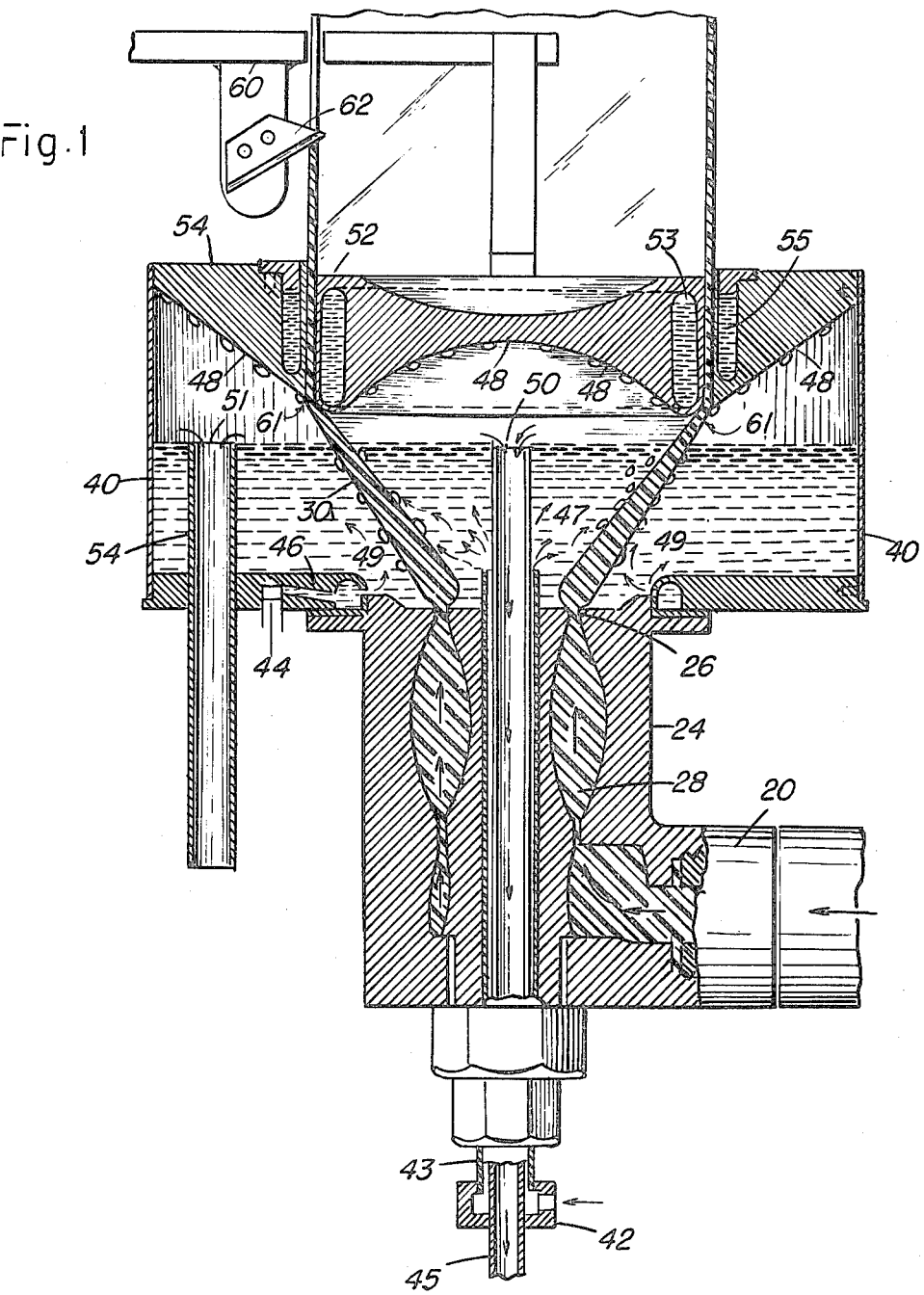
FIG. 1 is a cross section view of one form of apparatus which may be employed in the practice of the method of the present invention.
Figure 2B:
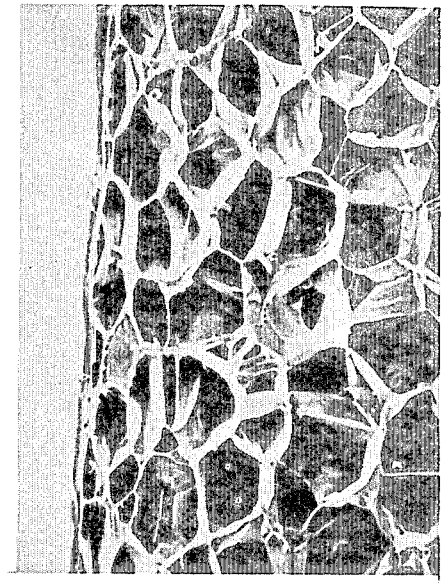
FIGS. 2-A,B,C, and D are reproductions of photomicrographs of certain foam samples produced in accordance with the examples set forth hereinafter.
Figure 2D:
Figure 2A:
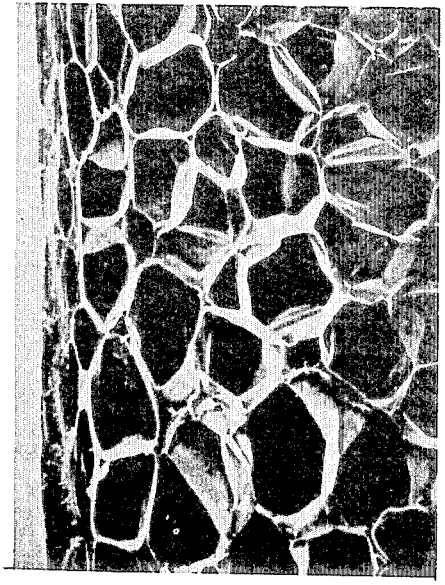
Figure 2C:
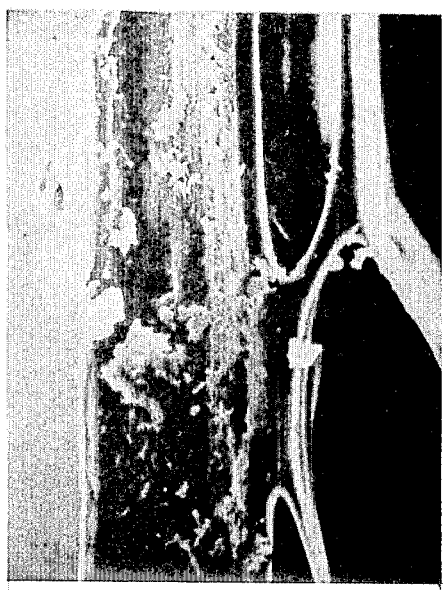

The present process for producing such improved products employs a combination of steps which take advantage of the unique properties of styrenic resin and water to produce a product having greater strength, particularly in the surface areas thereof, which are most susceptible to puncture failure as well as being concentration areas for bending stresses.

According to the present invention, molten styrenic polymer, in combination with blowing agent and nucleating agent, upon emerging from an extrusion die orifice is contacted immediately with water which is maintained at a temperature within a range of from about 30° C. up to 85° C., and preferably about 45° C. to 80° C. The polystyrene melt temperature is maintained at a temperature from about 125° C. to about 165° C. and preferably from about 130° C. to about 155° C. The preferred extrusion die temperatures range from about 120° C. up to about 190° C. and preferably from about 130° C. up to about 175° C. for styrene homopolymer. Although the precise mechanism whereby the foam physical characteristics are improved by maintaining such temperature ranges are not fully understood, it has been theorized that the foam, when emerged in liquid maintained within such a temperature range, reaches a temperature (at least in the surface areas of the foam) approximating its glass transition temperature and by as much as 5° C. above the Tg whereby orientation is being imparted to the foam as it is being expanded and stretched when passing through the water bath system and over the internal mandrel.

Accordingly, the present invention comprises a method for the production of thermoplastic polymer foam sheet by forming an extrudable foamable mass of styrenic polymer in admixture with a conventional blowing agent such as pentane, isopentane, carbon dioxide, freon, and the like. The foamable polystyrene is subsequently extruded from a die orifice into a liquid cooling medium. The liquid cooling medium is maintained from a temperature of from about 30° C. to about 85° C. The polymeric melt is foamed in the liquid cooling medium to form a foam sheet which exhibits improved tensile properties and puncture resistance when compared to prior art foam heretofore available.

The present invention is used advantageously in foam manufacturing processes carried out at ambient pressure. At low elevations the ambient pressure is sufficiently high (about 760 mmHg) to prevent boiling of the cooling water, even when the inlet cooling water is at 85° C. Thus, the manufacturing steps for foam forming, cooling, and stretching can be performed substantially in the absence of boiling. In order to maintain close control of the surface cooling process, a relatively high amount of liquid coolant is circulated in the extrusion zone in contact with the foaming polymer. The mass flow rate of water can be sufficiently high to prevent substantial temperature increases and/or boiling of the coolant. In general, a water temperature difference of less than about 5° C. between the coolant inlet and outlet can be achieved with high coolant throughput.

While the coolant temperature can be maintained essentially constant throughout the system, the polymeric extrusion mass is subject to considerable variation. This is largely due to the thermal insulation properties of the foamed material, which creates a layer of closed gas cells, thus diminishing heat transfer between the coolant and the foam interior. Foam density at the exterior surface is relatively high due to the retarding of gas cell formation by cooling.

The styrenic polymers that are particularly useful herein comprise thermoplastic homopolymers, copolymers and interpolymers of styrene and substituted styrenics. Various ethylenically-unsaturated organic compounds may be incorporated in styrenic resins, including alkyl-substituted styrenes, α-methyl styrene, 4-methyl styrene, vinyl benzenoids, halogenated styrenes, etc. Usually a major portion of the styrenin-polymer comprises one or more repeating units having the following structure:

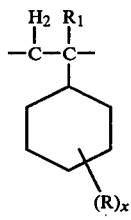

wherein
R is lower alkyl, halogen or hydrogen;
x is an integer from 0 to 5; and
$R_1$ is H or lower alkyl.

Typical lower alkyl groups include the $C_1$ to $C_6$ alkyl radicals, especially methyl. Preferred polymeric compositions contain at least 80% styrene or substituted styrene repeating units. The invention is especially useful for homopolymers of styrene and p-methyl styrene.

Referring to FIG. 1 of the drawing, molten polymer at a suitable temperature is forced due to pressure into a die 24 by way of an inlet 20. The molten polymer is forced upwardly through an annular passage 28 of the die 24 and emerges as a tubular shaped extrudate 30 from an annular orifice 26. Immediately upon exiting from the annular orifice 26, the molten polymer is contacted with water in a chamber 40. The tubular shaped extrudate 30 is drawn over an inner jacket member 52 which may be chilled with cold water (below 38° C.) circulated through cavity 53. The outer jacket member 54 may be used in conjunction with inner jacket member 52 with cold water in cavity 55 in direct contact with the tubular shaped extrudate. A knife 62 is mounted on a support 60 in the path of the tubularly shaped extrudate 30 so as to cut through the extrudate 30 drawn across the knife 62.

Of particular interest is that portion of the extrusion apparatus wherein the extrudate 30 passes through a bath of water contained in the chamber 40. Water is supplied at a center inlet 42. Water entering inlet 42 is forced upward in the annular opening between a hollow duct 45 and an enclosing hollow duct 43. This water may be discharged at a point 47 wherein the interior surface of the extruder 30 is contacted with the water. Water upon reaching the top 50 of the vertically adjustable duct 45 passes down the hollow inner portion of the duct 45 and may then be recooled and reintroduced at an inlet 42.

The outer surface of the extrudate 30 is cooled in a similar manner. Water may be forced into the outer inlet 44 and passes through a housing 46 and into the chamber 40 through an annular opening 49. Upon reaching the level of the top of a vertically adjustable hollow duct 51, the water passes down the hollow inner portion of the duct 51 and may then be recooled and reintroduced at outer inlet 44. In one embodiment the coolant temperature and bath height are the same at the interior and exterior surfaces of the extrudate being cooled. However, such temperatures might be held at different points and the bath height varied in order to achieve a particular product strength. The tubular extrudate may be contacted with the liquid coolant on one side only, if desired, either the inner tubular surface or outer surface being feasible. Numerous modifications of the cooling and orientation procedure are possible within the invention concept. For instance, at the point of maximum stretch 61, where the secondary cooling is applied, the extruded tube may pass across an appropriate seal on outer jacketed member 54 and contacted directly with coolant flowing through cavity 55, by removing the separating inner wall of ring member 54 to expose the secondary liquid coolant.

The present cooling technique may be employed with a double-surface liquid bath, as shown in FIG. 1 or single-surface liquid cooling may be employed. For instance, center inlet 42 may be shut down and liquid removed from interior zone 47. This results in a tubular foam structure having a dense outer skin on one side and a low-density foam surface on the opposite side. The single-skin tube may not have equivalent mechanical properties to that produced by inner and outer cooling baths; however, such structure may be adequate for many purposes. Since the single-skin tube does not develop large concentric force, compared to the double-skin tube, drawing the foam over the annular calendar ring 52 may require less force to be applied.

Under certain operating conditions it is advantageous to reduce sliding friction of the foam tube during orientation. Stretch forces of the foam as it passes over the annular inner ring member 52 may result in excessive friction as the foam slides over the ring surface. Double-skin foam is ordinarily more resistant to deformation and may require measures to decrease the sliding friction. A plurality of liquid ports in the lower portion of ring 52 permits cooling liquid to pass from cavity 53 to wet the mandrel surface, thus reducing friction.

Product quality can be enhanced by maintaining the extrudate temperature carefully. Since a significant amount of heat transfer can occur between the hot die and cool liquid bath at their interface, thus cooling the die excessively, improved extrudate temperature control can be achieved by thermally isolating the die face. In view of the frequency and severity of thermal changes in the equipment, a durable insulating material is desirable for the die face. Concentric ring thermal insulators adjacent to the die orifice can be provided at the die face surfaces in contact with the liquid bath. Suitable insulating materials include ceramics and plastics. Metal oxides, such as alumina, zirconia, zirconite or the like may be formed into the desired shape and adapted for mounting on the die face. Temperature-resistant epoxy resin filled with hollow glass microspheres is an excellent insulator that is also durable. Typically, a steel die with about 1 mm. or less of thermal insulation will be adequate to control die and extrudate temperature.

Figure 3:
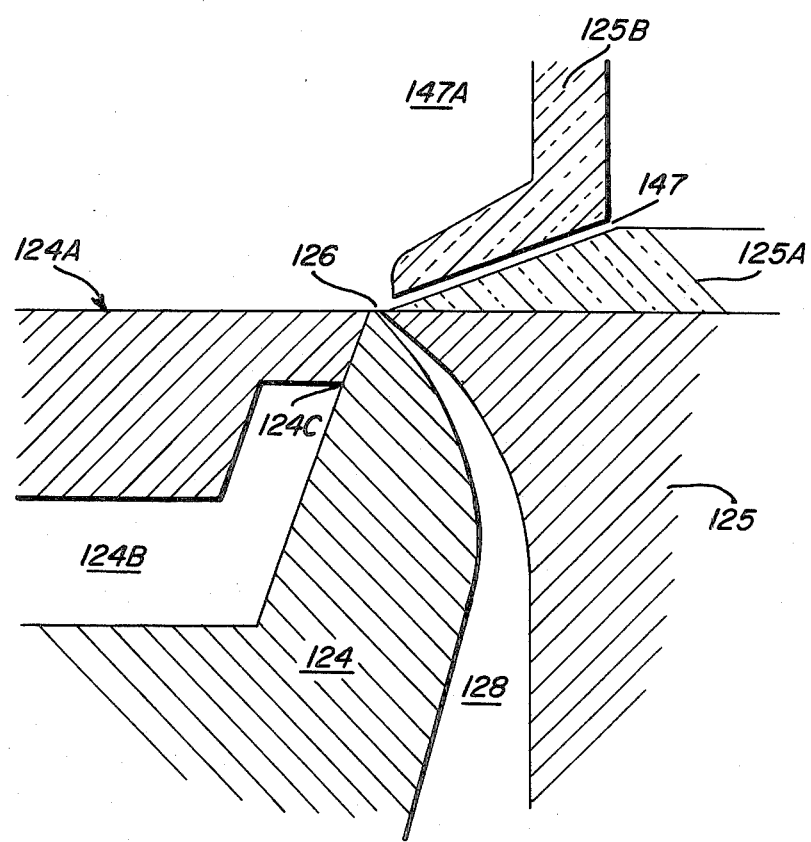
FIG. 3 is a detailed vertical cross-section view of an alternative die structure.

In FIG. 3 an alternative embodiment of the invention is shown in a cross-sectional detail view of the die and orifice, as part of a liquid-cooled extrusion system for producing tubular polymer foam wherein annular die means extrudes molten polymeric extrudate directly into a liquid coolant. The annular inner orifice means has inner lip means, such as arcuate finger 125, defining an inner orifice surface. The annular outer orifice means cooperates with the inner orifice means to form a slitring extrusion orifice 126. An outer insert means, such as finger insert 124, terminates to form an outer arcuate lip defining an outer orifice surface. The inner and outer orifice means define a flow passage 128 for molten extrudate. An outer annular die face member 124A extends outwardly from the outer lip means, and is sealed at 124C to the outer insert 124 adjacent the outer lip to define a gas space 124B between the die face and outer insert for thermally insulating the molten extrudate from the liquid coolant.

The apparatus for extruding molten polymer under pressure requires high strength materials to contain the extrudate and a sharply-defined orifice. The metal parts 124, 125 which form this part of the structure have a relatively high thermal conductivity. The die face member 124A is thermally isolated from the metal insert member 124 by an insulating airgap or sealant, such as silicone. At least one of the die surfaces can be thermally insulated. For instance, in the embodiment shown in cross-section, an insulating finger 125A extends from the orifice radially to insulate the metal inner lip member 125. The insulating member 125A may be in the form of an outwardly tapering annular disc which has decreasing thickness toward the orifice edge, as shown in FIG. 3. This insulating member in combination with member 125B forms a flow means 147 for directing liquid coolant toward the orifice. The outer die face member 124A may be partially or fully insulated in a similar manner, if desired. The thermally-insulating elements may attach directly to the die parts or be mounted on adjacent structures, such as conduit 50, as shown in FIG. 1. In certain design situations the extrusion system of the inner and outer annular orifice means may be disposed to form an orifice outlet angle to the die face for directing extrudate radially outwardly from the orifice.

Utilizing the apparatus described above, several rolls of foamed polystyrene were produced utilizing varying die temperatures and water bath temperatures as set forth in the following Table 1. All other line conditions such as extrudate feed rate, melt temperature, blowing agent and nucleating agent concentrations were held constant. Unless otherwise stated, the cooling water was applied to the outside of the tubular foam extrudate.

TABLE 1

| ROLL # | DIE TEMPERATURE | WATER BATH TEMPERATURE |
|---|---|---|
| R-1 | 149° C. (300° F.) | 74° C. (165° F.) |
| R-2 | 177° C. (350° F.) | 74° C. (165° F.) |
| R-3 | 177° C. (350° F.) | 80° C. (175° F.) |
| R-4 | 177° C. (350° F.) | 80° C. (175° F.) |
| R-5 | 177° C. (350° F.) | 85° C. (175° F.) |
| R-6 | 177° C. (350° F.) | 91° C. (195° F.) |
| R-7 | 177° C. (350° F.) | 91° C. (195° F.) |
| R-8 | 133° C. (270° F.) | 91° C. (195° F.) |
| R-9 | 177° C. (350° F. | 85° C. (185° F.) |

As can be seen from the foregoing Table 1, nine rolls of material were produced, with rolls 2–7 inclusive made at a constant die temperature and increasing bath temperatures. The following Table 2 sets forth the results of physical testing on these rolls of polystyrene foam.

TABLE 2

| FOAM SHEET PROPERTIES | | | | | |
|---|---|---|---|---|---|
| Roll # | R-1 | R-2 | R-3 | R-4 | R-5 |
| PROPERTY | | | | | |
| Basis Wt. (g/100 in$^2$) | 9.7 | 10.2 | 10.3 | 10.2 | 10.7 |
| Thickness (in.) | .093 | .099 | .092 | .104 | .113 |
| Cell Count (2 × 2) | 7 | 5 | 6 | 6 | 6 |
| Open Cell (5) | 2 | 6 | 4 | 4 | 5 |
| Volatiles (%) | 5.71 | 4.61 | 4.91 | 4.76 | 4.89 |
| Rack blow up | 1.53 | 1.42 | 1.42 | 1.42 | 1.38 |
| Puncture Resistance (PSI) | 898 | 964 | 867 | 895 | 639 |
| **Tensile properties: | | | | | |
| MD modulus | 11000 | 10900 | 10200 | 10100 | 7900 |
| (PSI) | 9400–11600 | 9900–12200 | 9200–11200 | 8200–12100 | 7000–8700 |
| TD modulus | 9900 | 10000 | 9800 | 10100 | 7000 |
| (PSI) | 9200–10900 | 9600–10400 | 9300–10300 | 8100–12800 | 6500–7500 |
| MD tensile | 204 | 193 | 181 | 188 | 148 |
| strength (PSI) | 175–222 | 174–214 | 164–202 | 148–221 | 133–160 |
| TD tensile | 181 | 177 | 187 | 182 | 139 |
| strength (PSI) | 164–193 | 162–192 | 180–196 | 160–212 | 125–149 |
| MD elong. to break | 2.9 | 2.5 | 2.7 | 3.2 | 3.0 |
| (%) | 2.6–3.3 | 1.9–3.0 | 2.1–3.6 | 2.7–3.5 | 2.4–3.4 |
| TD elong. to break | 4.3 | 4.5 | 6.2 | 4.6 | 4.3 |
| (%) | 3.6–5.1 | 2.9–6.2 | 3.8–8.1 | 3.1–6.1 | 3.2–5.9 |
| MD toughness | .70 | .59 | .58 | .76 | .65 |
| (in0lbs) | .53–.85 | .33–.82 | .38–.93 | .49–.90 | .49–.83 |
| TD toughness | 1.05 | 1.15 | 1.71 | 1.15 | .98 |
| (in-lbs) | .79–1.34 | .57–1.81 | .93–2.37 | .72–1.59 | .58–1.52 |
| ROLL # | R-6 | R-7 | R-8 | R-9 | |
| PROPERTY | | | | | |
| Basis Wt. (g/100 in$^2$) | 10.4 | 10.3 | 10.1 | 14.0 | |
| Thickness (in.) | .121 | .112 | .087 | .127 | |
| Cell Count (2 × 2) | 6 | 6 | 7 | 5 | |
| Open Cell (%) | 3 | 4 | 1 | 4 | |
| Volatiles (%) | 4.61 | 4.60 | 5.07 | 3.92 | |
| Rack blow up | 1.43 | 1.37 | 1.58 | 1.42 | |
| Puncture Resistance (PSI) | 536 | 611 | 1148 | 898 | |
| **Tensile properties: | | | | | |

TABLE 2-continued
FOAM SHEET PROPERTIES

| | | | | |
|---|---|---|---|---|
| MD modulus (PSI) | 6200 | 7300 | 13000 | 9400 |
| | 5500–6700 | 700–7600 | 12500–13800 | 8400–1050 |
| TD modulus (PSI) | 6200 | 7100 | 12100 | 8700 |
| | 6000–6400 | 6800–7400 | 11600–12900 | 7900–9100 |
| MD tensile strength (PSI) | 123 | 146 | 241 | 169 |
| | 117–131 | 138–155 | 235–253 | 153–188 |
| TD tensile strength (PSI) | 125 | 146 | 213 | 162 |
| | 118–131 | 139–154 | 198–229 | 156–175 |
| MD elong. to break (%) | 3.7 | 3.3 | 4.3 | 3.1 |
| | 2.4–5.4 | 3.1–3.5 | 3.3–5.1 | 2.6–3.6 |
| TD elong. to break (%) | 4.4 | 5.9 | 4.9 | 4.2 |
| | 3.7–5.4 | 5.0–7.7 | 2.8–6.2 | 3.4–5.7 |
| MD toughness (in-lbs) | .76 | .71 | 1.33 | .87 |
| | .41–1.15 | .64–.80 | .92–1.69 | .62–1.14 |
| TD toughness (in-lbs) | .97 | 1.47 | 1.16 | 1.18 |
| | .73–1.28 | 1.22–2.05 | .65–1.92 | .56–1.92 |

**Five replicates were used in each test.

As can be seen from the foregoing Table 2, foam rolls 2-7 inclusive show a definite deterioration of properties as the water bath temperature was increased, such properties including puncture resistance modulus and tensile. It was found that the thickness of skin formed on the surface of the foam sheets varied in an inverse relationship with the water bath temperature. At lower temperatures, the skin was relatively thick and conversely as the temperature was increased, the thickness of the foam skin layer was reduced. Utilizing the apparatus as shown in FIG. 1, at low bath temperatures on the order of below about 60° C. (140° F.), undesirable fibrillation can occur on the foam surface due to the rapid cooling. When the temperature of the foam bath was raised to 100° C. only a very slight skin was formed on the surface whose thickness was insufficient to provide the desirable foam physical characteristics produced with the method of the present invention.

As shown in the preceeding Table, rolls R-1 and R-2 exemplify a constant bath temperature of 165° F. and a 50° F. die temperature increment from roll R-1 to roll R-2. It was found in the case of these sample rolls that a smoother surfaced foam was produced when higher melt temperatures on the order of from about 143° C. (290° F.) up to about 149° C. (300° F.) were employed. As the die temperature was increased a noticeable increase in gauge was made. This change can be seen by comparing the thickness data as shown in Table 2 for rolls R-7 and R-8, nearly the same density or basis weight material is formed. The bath temperatures are similar (90° C.), the gauge decreased more than 20 mils with the physical properties of the foam being increased noticeably upward.

The foam skins formed at the two extremes of operating conditions, rolls R-2 and R-6 are shown in FIGS. 2-A,B,C and D. FIGS. 2-A and 2-B show cross sections of material from rolls R-2 and R-6 respectively, at relatively low magnification. FIGS. 2-C and 2-D show the same cross section at a higher magnification, i.e., 100 X versus 700 X. From these illustrations it can clearly be seen that the colder bath temperature produced approximately twice the skin thickness as the warmer bath produced. It should also be noted that unlike laminate materials, the skin is comprised of collapsed cells which are fused together and/or a solid polymer matrix with included blowing agent. There is no gross discontinuity as found at the interface of laminated material which might lead to failure or delamination.

In a typical continuous polystyrene foam production run with the equipment being operated under steady state conditions, the maximum temperature differential in the bath is small. The actual temperature increase from water inlet to outlet in the 60° to 65° C. operating range is only about 2° to 3° C. for a well-cooled system. A coolant throughput rate of about 1.5 to 5 parts by weight per part of polymer throughput gives a maximum temperature variation of less than 5° C. throughout the bath. Close temperature control can be effective in achieving uniform product quality.

It has been found that water-cooled foam which is produced in accordance with the present invention may be utilized in the production of thermoformed articles including items such as trays and plates and the like which exhibit superior strength characteristics as contrasted to similar objects fabricated from convention foam.

In the following Table 3, the physical properties of thermoformed plate structures fabricated from conventional polystyrene foam sheeting, i.e., foam produced utilizing only air as the foam coolant, are compared to thermoformed plates fabricated from the water-cooled foam of the present invention, and particularly from roll R-5 described hereinabove.

TABLE 3

| PROPERTY | | CONVENTIONAL FOAM | ROLL R-1 |
|---|---|---|---|
| Puncture resistance (PSI) | | 351 | 692 |
| Thickness (in.) | | .099 | .099 |
| Weight (g.) | | 6.41 | 6.41 |
| Cantilever Test | | | |
| Stiffness (lbs/in. defl) | MD | 1.66 | 1.74 |
| | TD | 1.47 | 1.91 |
| Ultimate (lbs.) | MD | 1.47 | 1.46 |
| | TD | 1.44 | 1.72 |
| Yield strength | MD | 1.11 | 1.23 |
| | TD | 1.09 | 1.47 |
| Yield deflection (in.) | MD | .73 | .82 |
| | TD | .79 | .85 |
| toughness (ins. - lbs.) | MD | 1.44 | .86 |
| | TD | 1.61 | 1.05 |
| deflection (in.) | MD | 1.49 | 1.08 |
| | TD | 1.69 | 1.13 |

As can be seen from the foregoing data and in particular cantilever test data, the water-cooled foam plate (at the same weight and gage) is about 5% to 30% stiffer than the plate fabricated from the conventional sheet. Accordingly, at the same surface loading, plates fabricated from polystyrene foam utilizing the present foam extrusion process will deflect or bend less under loading. The ultimate strength is also considerably higher, meaning you can load the plate with more material before it will fail. As also shown in Table 3, the puncture resistance of the plate fabricated from the water-cooled foam is nearly twice as great as that from conventional foam.

Although the method in accord with the present invention has been described hereinbefore in terms of the tubular extrusion process for the production of polystyrene foam it will be appreciated by those skilled in the art that other conventional foam sheet extrusion techniques may be employed including employment of a slot die for the extrusion of the foam in the form of a flat sheet, rather than a tube, into the cooling medium.

Although the apparatus and process of this invention have been illustrated with preferred embodiments, it is to be understood that modifications and variations may be employed without departing from the spirit and scope of this invention.

We claim:

1. In a method for the production of foam sheet by forming an extrudable, foamable mass containing styrenic polymer and a foaming agent; extruding said mass from an annular die in a tubular form into an extrusion zone; drawing said tubular extrudate over an internal mandrel; and slitting said drawn tube to form a sheet; the improvement which comprises:
    providing an annular inner orifice means having inner lip means defining an inner orifice surface and annular outer orifice means cooperating with said inner orifice means to form a slit-ring extrusion orifice with outer lip means defining an outer orifice surface, said inner and outer orifice means defining a flow passage for molten extrudate;
    isolating the molten extrudate in a flow passage thermally from a liquid coolant medium;
    extruding said foamable polymer directly into said liquid coolant medium maintained at a temperature of about 30° C. to 85° C., at ambient pressure, said coolant medium being contacted with said foamable polymer at a flow rate sufficient to prevent substantially boiling thereof by directing liquid coolant from a flow means adjacent the orifice toward the extruded polymer; and
    foaming said extrudate in said liquid coolant medium to form a tubular foam structure having improved tensile properties and puncture resistance.

2. The method of claim 1 wherein said liquid coolant medium consists essentially of water maintained at a temperature of about 45° C. to 80° C.

3. The method of claim 2 wherein the foamable mass is extruded at a temperature of about 125° C. to 160° C. and consists essentially of styrene homopolymer, pentane and a nucleating agent.

4. The method of claim 3 wherein the extrudate temperature is from 130° C. to 155° C.

5. The method of claim 2 wherein the coolant medium is circulated in the extrusion zone at a throughput rate of about 1.5 to 5 parts by weight of water per part of polymer throughput.

6. The method of claim 3 wherein a maximum temperature between water inlet and outlet of less than about 5° C. is maintained.

7. The method of claim 6 wherein said maximum temperature is less than about 3° C. under steady state conditions.

8. A foam structure which has been produced with the method as defined in claim 1.

9. In a liquid-cooled extrusion system for producing tubular polymer foam wherein annular die means extrudes molten polymeric extrudate directly into a liquid coolant, the improvement which comprises:
    annular inner orifice means having inner lip means defining an inner orifice surface;
    annular outer orifice means cooperating with said inner orifice means to form a slit-ring extrusion orifice and having outer insert means terminating to form outer lip means defining an outer orifice surface, said inner and outer orifice means defining a flow passage to the extrusion orifice for molten extrudate;
    an outer annular die face member extending outwardly from said outer lip means, said annular die face being sealed to said outer insert means adjacent said outer lip means and defining a space between the die face and outer insert means to isolate the molten extrudate thermally from the liquid coolant; and
    means adjacent the orifice for directing liquid coolant at controlled temperature toward the orifice.

10. The improved extrusion system of claim 9 further comprising at least one thermal insulator element overlying at least one orifice lip means to insulate the lip means from liquid coolant.

11. The improved extrusion system of claim 9 wherein the inner and outer annular orifice means are disposed to form an orifice outlet angle to the die face for directing extrudate radially outwardly from the orifice.

12. An extrusion system for manufacturing oriented polymer foam sheet comprising:
    annular orifice means for extruding foamable polymer under pressure in tubular shape with a die face defining an extrusion zone;
    means for maintaining liquid coolant in the extrusion zone adjacent the annular orifice means;
    thermal insulation means disposed between at least a portion of the die face of the annular orifice means and the liquid coolant for controlling extrudate temperature within the orifice means;
    means for directing liquid coolant toward the polymer extrudate adjacent the orifice means; and
    annular ring orienting means including means for drawing the extruded polymer foam over the annular ring to orient the polymer.

13. The extrusion system of claim 12 comprising coolant circulation means operatively connected to the coolant directing means to receive liquid coolant from adjacent the orifice means.

14. The extrusion system of claim 12 wherein said liquid coolant is maintained outside the tubular polymer extrudate.

15. The extrusion system of claim 12 wherein said liquid coolant is maintained inside the tubular polymer extrudate.

16. The extrusion system of claim 12 wherein the thermal insulation means comprises a tapering annular disc having decreasing thickness toward the orifice means.

* * * * *